United States Patent [19]

Lambie

[11] Patent Number: 4,657,576
[45] Date of Patent: Apr. 14, 1987

[54] GRANULAR FERTILIZER COMPOSITION HAVING CONTROLLED RELEASE AND PROCESS FOR THE PREPARATION THEREOF

[75] Inventor: Johannes M. H. Lambie, Eckelrade, Netherlands

[73] Assignee: Sierra Chemical Company, Milpitas, Calif.

[21] Appl. No.: 797,501

[22] Filed: Nov. 13, 1985

[30] Foreign Application Priority Data

Nov. 16, 1984 [NL] Netherlands .................. 8403505

[51] Int. Cl.$^4$ .................. C05G 3/00; C05G 5/00
[52] U.S. Cl. .................. 71/64.07; 71/64.11
[58] Field of Search .............. 47/74; 71/64.07, 64.11, 71/64.13

[56] References Cited

U.S. PATENT DOCUMENTS 3,219,433 11/1965 Brewster et al. .................. 71/64.11
3,921,333 11/1975 Clendinning et al. .................. 47/74

FOREIGN PATENT DOCUMENTS 45-6853 3/1970 Japan .................. 71/64.11
47-13681 4/1972 Japan .................. 71/64.11
954555 4/1964 United Kingdom .................. 71/64.11

Primary Examiner—Ferris H. Lander
Attorney, Agent, or Firm—Robert Wickersham; William H. Benz

[57] ABSTRACT

Fertilizer composition in granular form having a regulated release of water-soluble fertilizer agents such as nitrogen, phosphorous, and potassium compounds. Each granule has a core comprising fertilizer substances having a known pH value, and a coating encapsulating the core. The coating is based on dicyclopentadiene and either linseed oil or a soy bean oil alkyd. The coating serves as a pH-regulator, so that for a core having a pH value below 6.0, the pH of the coating is regulated to be in the range of 6.0 to 9.0, while for a core having a pH value higher than 6.0 the coating includes a mixture of trace element compounds and has a pH value lying between 4.5 and 9.0.

28 Claims, 1 Drawing Figure

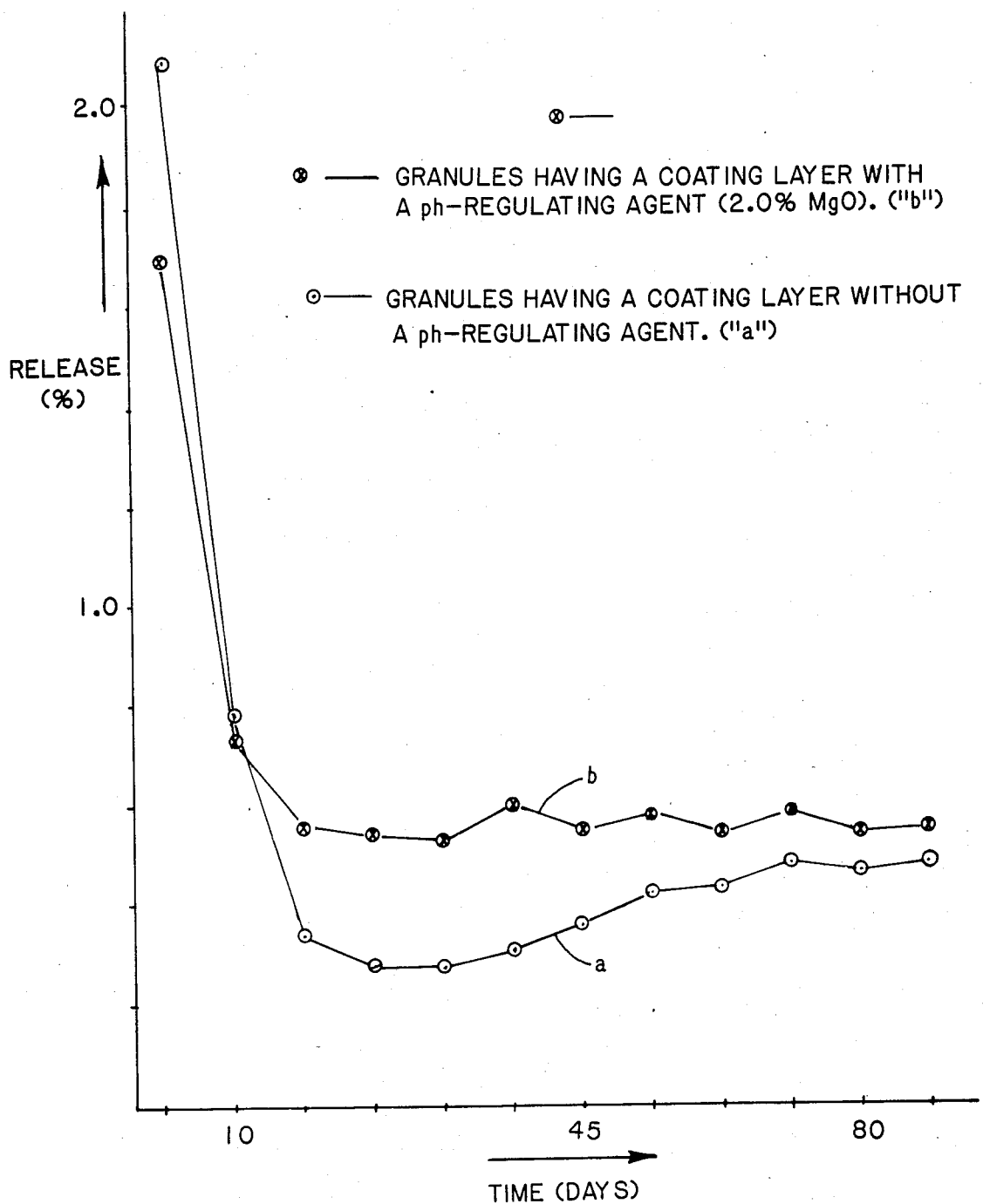

GRANULAR FERTILIZER COMPOSITION HAVING CONTROLLED RELEASE AND PROCESS FOR THE PREPARATION THEREOF The invention relates to a granular fertilizer composition providing controlled release of active fertilizer substances such as nitrogen, phosphorous and/or potassium compounds, by means of a novel coating around a core of the fertilizer substances. The coating is based on a formulation comprising polymerized oil. The invention also relates to a process for the preparation of such a fertilizer composition and for the production of such a fertilizer composition in a granular form.

BACKGROUND OF THE INVENTION

U.S. Pat. No. 3,223,518 and Dutch Pat. No. 132,686 disclose a process for the preparation of a granular fertilizer having a coating of a water-insoluble resin around the fertilizer, and this coating delays the release of the fertilizer. The coating comprises several layers, each formed from a solution of a copolymer of dicyclopentadiene and either linseed oil or an alkyd resin based on a soy bean oil. Such a composition is sold in the market under the registered trademark "Osmocote", a trademark of Sierra Chemical Company.

A published Dutch patent application No. 8204992 discloses a process for the preparation of fertilizer in which a controlled start for the release of the fertilizer is provided by applying to the fertilizer core a layer of a water repellent which is nearly insoluble in water, or a water swelling agent. The fertilizers may comprise trace-elements, and the coating is preferably applied to a thickness of $10^{-8}$ m to 1 cm. With this composition it is possible to control the release of the fertilizer so that the release starts preferably after 30 days and up to about 180 days. Because of the fact that in this patent application no specific choice is made regarding the coating material to be supplied (see page 5 of Dutch patent application No. 8204992) it is acceptable for the delaying action for the release of the fertilizer to be determined by the thickness of the coating.

The fertilizer composition being sold under the registered trademark Osmocote (Sierra Chemical Company), gives a reasonable release of fertilizers such as potassium, nitrogen and phosphorus compounds. There is a comparatively rapid release during the first few days, then a decreasing rate of release during about ten days and finally a constant rate of release at a reasonably high level. It also is important that, besides the controlled release of the fertilizer, the granular fertilizer be exhausted as much as possible after a certain time, so that after that period of time, as much fertilizer as possible is removed from the granule and is supplied to the plants or to the ground.

In practice, it now appears to be desirable for the rate of release of the fertilizer to be controlled in a way that supplies more fertilizer to the plant when its growth increases. For young plants it is desired that they grow in a soil having a sufficient amount of fertilizer; so the aim is to have a substantially high release rate of fertilizer during the first days and then a decreased rate to a reasonable but still high level.

SUMMARY OF THE INVENTION

According to the present invention, this aim is reached with a fertilizer composition which regulates the pH. For a core having a fertilizer composition in which the ph-value is below 6, the coating contains a pH-regulating agent by which the pH of the coating can be set at 6.0–9.0. For a fertilizer composition having a pH-value of 6 or higher, the coating includes a mixture of trace-element compounds having a pH-value of 4.5–9.0. The coating is based on a soy bean oil alkyd or linseed oil and cyclopentadiene. The pH-regulating agent can be supplied in the coating directly around the core of fertilizer, but it also is possible to supply a first coating around the core, based on the copolymer of dicyclopentadiene and linseed oil or the soy bean oil alkyd, after which a generally similar second layer is supplied, which is preferably thinner and includes the pH-regulating agent.

The mechanism of the controlled release of the fertilizer is based on the modification of the coating, so that the coating deteriorates at a rate dependent on the lapse of time, in such a way that the fertilizer compounds are regularly released after a short starting period. Because the coating is so deteriorated in this way after the lapse of a certain period, more fertilizer compounds are released than with the coated fertilizer compositions known up till now. The invention is not, however, to be restricted to this explanation of the invention.

From the experiments that have been carried out, it appears that for coatings based on dicyclopentadiene and linseed oil or alkyd resin based on a soy bean oil, the pH-value of the coating is an important factor. At a pH above 6.0 an attack on or deterioration of the coating will sooner occur than at lower pH-values. This "attack" can be made stronger by adding into the coating some granules of magnesium oxide and/or some further trace-elements. If the pH-value of the fertilizer core is already relatively high, the "attack" of the coating can happen from the inside, so that it is less necessary to add a pH-elevating agent to the coating than with a core of fertilizer having a relatively low pH-value, for example a pH-value of 5.5.

If the pH-value of the coating is above 9.0, then this pH regulation in the coating is less desired, because during storage of the fertilizer composition an alteration or deterioration occurs in the coating, so that there is an aging effect on the total fertilizer composition; as a result, when this fertilizer composition is used, a larger portion of the fertilizer composition is released in the beginning than would otherwise be the cose. For this reason it is required that the pH-value so lie between 6.5 and 9.0.

It is known to add magensium oxide, and it is known to add trace-elements to a fertilizer composition; it is also known to regulate the pH-value of fertilizer such, that this value is between about 6 and about 12, as it has been disclosed in WO 84/03503; however, heretofore the additives to regulate the pH-value have been incorporated in the *core* of the fertilizer and not in the *coating*. Besides this, the fertilizer according to this known patent application 84/03503 was based on a urea-formaldehyde condensate.

A preferable agent for regulating the pH in the coating is magnesium oxide. Magnesium oxide is preferred because it can also function as a fertilizer in addition to imparting its pH-regulating action. Another example of a comparable substance having comparable functions, but less pronounced in its pH-regulating action is sodium molybdate. If the amount of magnesium oxide or sodium molybdate or other comparable substance which needs to be added in order to bring the pH-value to the desired level would be too great in comparison with the other fertilizer substances, it also is possible to add a basic organic substance, such as an amine, e.g., dimethylethanolamine.

The advantage of the fertilizer composition according to this invention is that it becomes possible to make optimum use of the fertilizer substances, varying the composition depending on the kind of plants to be cultured and on the composition of the soil.

BRIEF DESCRIPTION OF THE DRAWING

The sole FIGURE is a graph with the rate of release in percent plotted against the time in days.

DESCRIPTION OF A PREFERRED EMBODIMENT

Example I

To 1 kg. of 21-7-14 (NPK) granular fertilizer, in granules having a diameter of 1-3 mm., was added 69 g. of coating material having a composition as disclosed in the example of Dutch Pat. No. 132,686 (the copolymer of dicyclopentadiene and alkyd resin from soy bean oil, known as Osmocote-coating). The mixture was heated to a temperature of about 70° C., after the granules and the coating material were well mixed in order to obtain a uniform coating on the granules. In this way a granular coated fertilizer was obtained. Then an additional 30 g. of the "Osmocote-coating" was mixed with 22 g. MgO in particles having a size of no more than 100 m. After homogenization, the MgO-comprising mixture was supplied to the granular fertilizer having the first coating at a temperature of 70° C., so that a product according to the invention was obtained, in which MgO was present as a pH-regulating substance in the second coating, which had a pH of 8.0. On supplying the two layers, an 18-6-12 product was obtained.

In FIG. 1 the two curves indicate the relation between the release of the fertilizer and the time, measured at a certain day. Curve "a" indicates a control, the known granular fertilizer having a one layer coating, without a pH-regulating agent. Curve "b" shows a comparable relation for a coated granular fertilizer in which the second layer includes MgO, as just described. The data in FIG. 1 are summarized in the table below.

The data in the table were obtained through the sand-leach test, a standard method to determine the release rate from products having a coating. In this test 8.0 g. end product was mixed with 290 g. clean washed sand, and this mixture was supplied to a funnel comprising a filter. This funnel was used for measurement at room temperature, and after a certain period, of, at first, three days and then once a week, 180 ml. distilled water was poured over the sand and the water collected in a flask of 200 ml. The conductivity of this collected water was measured as an indication for the amount of fertilizer released. This experiment was carried out at 21° C.

TABLE

| Composition After a period of a number of days | Without pH-regulating agent | | With a pH-regulating agent (2.0% MgO) | |
|---|---|---|---|---|
| | in total (%) | for 1 day (%) | in total (%) | for 1 day (%) |
| 1-3 | 6.2 | 2.08 | 5.1 | 1.70 |
| 4-10 | 11.7 | 0.78 | 10.2 | 0.73 |
| 11-17 | 14.1 | 0.34 | 14.1 | 0.56 |
| 18-24 | 16.0 | 0.28 | 17.9 | 0.54 |
| 25-31 | 18.0 | 0.28 | 21.6 | 0.53 |
| 32-38 | 20.2 | 0.31 | 25.8 | 0.60 |
| 39-45 | 22.7 | 0.36 | 29.7 | 0.55 |
| 46-52 | 25.6 | 0.42 | 33.7 | 0.58 |//
| 53-59 | 28.6 | 0.43 | 37.5 | 0.54 |
| 60-66 | 32.0 | 0.48 | 41.6 | 0.58 |
| 67-73 | 35.2 | 0.46 | 45.4 | 0.54 |
| 74-80 | 39.0 | 0.54 | 49.2 | 0.55 |

From the data in the table it appears that for the known fertilizer composition, 39.0% of the fertilizer was released after 80 days. For the composition according to the invention, 49.2% was released. The release level from day 10 is higher from the composition according to the invention than for the known fertilizer composition.

EXAMPLE II

The process was repeated as in Example I, except for use of an NPK-fertilizer of 15-15-15, which, after supplying the coating of Osmocote, had a composition of 14-14-14. The original NPK-fertilizer had a pH-value of 6.3, and after applying the coating, the pH-value was 6.4. Granules without trace-elements in the coating gave, after 66 days, a total amount of released fertilizer of 44%, of which the slowly acting part was 35%. By bringing into the coating a trace-element composition having a pH-value of 4.5, after a same period of 66 days, the total released fertilizer was 45%, while the slowly acting part was 39%.

By using a mixture of trace-elements having a somewhat higher pH-value of 4.9, the total amount of released fertilizer composition was increased to 47% and the slowly acting part to 39%. These experiments indicate that the total amount of released fertilizer composition can be increased and also the slowly active part can be increased by 10% by the addition of trace-elements to the coating of a fertilizer of which the core has a pH-value higher than 6.

A suitable composition of the trace-elements to be added comprises 43% by weight MgO, 3% $H_3BO_3$, 5% $CuSO_4.5H_2O$, 28% $FeSO_4.2H_2O$, 9% Fe (EDTA), 9% $MnSO_4$, and 4% $ZnSO_4.2H_2O$. The pH-value of this composition is 6.0 and the pH-value of such a composition can be decreased by e.g., increasing the content of $H_3BO_3$.

Concerning the results obtained, one can only compare such fertilizer compositions as are used in one example. It is quite difficult to compare the results of the several examples, because in the instance of several examples, different fertilizers may have been used, and they can differ because of several factors, such as the granule form and the density of the granules.

EXAMPLE III

In this process, starting with an NPK-fertilizer 15-11-13 having a pH-value of 6.0, coated with Osmocote, the total amounts of fertilizer released after 66 days was 43% and the slowly acting part was 37%. By supplying to the Osmocote coating trace-elements having a pH-value of 8.1, (of which the composition was 63% MgO, 3% $H_3BO_3$, 6% $CuSO_4.5H_2O$, 9% $FeSO_4.2H_2O$, 11% Fe (EDTA), 6% $MnSO_4$, 1% $Na_2MoO.H_2O$ and 1% $ZnSO_4.2H_2O$) the total amount of released fertilizer composition after 66 days was increased to 51%, and the slowly acting part was increased to 41%.

By using a different composition of trace-elements having a pH-value of 8.8, (87% MgO and 13% FeSO$_4$.H$_2$O), the total amount of released fertilizer was 49% and the slowly acting part was 42%.

From this result a significant improvement can be seen in the total amount of released fertilizer, as well as an improvement in the slowly acting part, all of which is quite important for a fertilizer composition.

EXAMPLE IV

The process of Example I was repeated, except that the Osmocote coating was replaced by a coating based on linseed oil instead of the alkyd resin based on soy bean oil. The coating as supplied was thicker being a coating in an amount of 9%, calculated on basis of the fertilizer instead of 6% as used in Example I. By doing so, a fertilizer composition was obtained with a longer active release time. Starting with an NPK-fertilizer 21-7-14 that after the addition of the coating had a composition of 18-6-12 and a pH-value of 5.6, the total amount of released fertilizer after 66 days was 14% and the slowly acting part was 9%. By supplying trace-elements into the coating (the composition of trace-elements being 43% MgO, 28% FeSO$_4$.2H$_2$O, 3% H$_3$BO$_3$, 5% CuSO$_4$.5H$_2$O, 9% Fe (EDTA), 9% MnSO$_4$ and 3% ZnSO$_4$.2H$_2$O, having a pH-value of 6.0), the total amount of released fertilizer was increased to 28% and the slowly acting part was increased to 23%.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. Fertilizer composition in granular form having a regulated release of water-soluble fertilizer agents such as nitrogen, phosphorous, and potassium compounds, each granule having
    a core comprising fertilizer substances having a known pH value, and
    a coating encapsulating the core, said coating being based on a dicyclopentadiene and linseed oil or a soy bean oil alkyd,
    said coating serving as a pH-regulator, so that for a core having a pH value below 6.0 the pH of the coating is regulated to be in the range of 6.0 to 9.0 while for a core having a pH value higher than 6.0 the coating includes a mixture of trace element compounds and has a pH value lying between 4.5 and 9.0.

2. The fertilizer composition according to claim 1, wherein said coating comprises a first coating layer without any pH-regulating agent and a second coating layer around said first layer and including the pH-regulating agent.

3. Fertilizer composition in granular form having a regulated release of water-soluble fertilizer agents such as nitrogen, phosphorous, and potassium compounds, each granule having
    a core comprising fertilizer substances having a pH value below 6.0, and
    a coating encapsulating the core, said coating being based on a dicyclopentadiene and linseed oil or a soy bean oil alkyd,
    said coating having a pH value regulated to be in the range of 6.0 to 9.0.

4. The fertilizer composition according to claim 3, wherein said coating comprises a first coating layer without any pH-regulating agent and a second coating layer around said first layer and including the pH-regulating agent.

5. The fertilizer composition according to claim 4, wherein the pH-regulating agent is magnesium oxide.

6. The fertilizer composition of claim 5, in which
    first the coating layer is present at the rate of about 70 gram per kg. of the fertilizer,
    the second coating layer is present at the rate of about 40 grams per kg. of the fertilizer plus about 20 g. MgO.

7. The fertilizer composition of claim 6 wherein the fertilizer is a 21-7-14 NPK granule fertilizer.

8. The fertilizer composition of claim 7 wherein the MgO is incorporated into the second coating layer in particles no larger than 100 m.

9. The fertilizer composition of claim 6 wherein the coating is a copolymer of dicyclopentadiene and an alkyd resin based on soy bean oil.

10. The fertilizer composition according to claim 4, wherein the pH-regulating agent is sodium molybdate.

11. The fertilizer composition according to claim 4, wherein the pH-regulating agent is dimethylethanolamine.

12. The fertilizer composition according to claim 3, wherein the pH-regulating agent is magnesium oxide.

13. The fertilizer composition of claim 12 wherein the coating is a copolymer of dicyclopentadiene and linseed oil and the total amount of coating in the layers is 9% by weight of the fertilizer; the fertilizer having a NPK ratio of 21-7-14 and a pH value with the coating but excluding the trace elements of 5.6.

14. The fertilizer composition of claim 13 in which the trace elements are, by weight, 43% MgO, 28% FeSO$_4$.2H$_2$O, 3% H$_3$BO$_3$, 5% CuSO$_4$.5H$_2$O, 9% Fe (EDTA), 9% MnSO$_4$ and 3% ZnSO$_4$.2H$_2$O, having a pH value of 6.0.

15. The fertilizer composition according to claim 3, wherein the pH-regulating agent is sodium molybdate.

16. The fertilizer composition according to claim 3, wherein the pH-regulating agent is dimethylethanolamine.

17. The fertilizer composition according to claim 3, wherein the coating contains trace-element compounds.

18. Fertilizer composition in granular form having a regulated release of water-soluble fertilizer agents such as nitrogen, phosphorous, and potassium compounds, each granule having
    a core comprising fertilizer substances having a known pH above 6.0, and
    a coating encapsulating the core, said coating being based on a dicyclopentadiene and linseed oil or a soy bean oil alkyd,
    said coating including a mixture of trace element compounds and having pH value lying between 4.5 and 9.0.

19. The fertilizer composition of claim 18 wherein
    the NPK ratio of the fertilizer exclusive of the coating is 15-15-15, with a pH of 6.3,
    the coating, before addition of the trace element compounds is 4.5, and
    trace element compounds are, by weight 43% MgO, 3% H$_3$BO$_3$, 5% CuSO$_4$.5H$_2$O, 28% FeSO$_4$.2H$_2$O, 9% Fe (EDTA), 9% MnSO$_4$ and 4% ZnSO$_4$.2H$_2$O, having a pH value of 6.0.

20. The fertilizer composition of claim 18 wherein
the NPK ratio of the fertilizer exclusive of the coating is 15-11-13, with a pH of 6.0, without coating, and
the trace element compounds are, by weight, 63% MgO, 3% H$_3$BO$_3$, 6% CuSO$_4$.5H$_2$O, 9% FeSO$_4$.2H$_2$O, 11% Fe (EDTA), 6% MnSO$_4$, 1% ZnSO$_4$.2H$_2$O, and 1% Na$_2$MoO.H$_2$O having a pH value of 8.1.

21. The fertilizer composition of claim 18 wherein
the NPK ratio of the fertilizer exclusive of the coating is 15-11-13, without the coating, with a pH of 6.0, and
the trace element compounds are, by weight 87% MgO, 13% FeSO$_4$.H$_2$O at a pH value of 8.8.

22. A process for the production of a fertilizer composition as disclosed in claim 1, comprising the steps of
coating the granular fertilizer with a first coating layer based on dicyclopentadiene and either linseed oil or an alkyd of soy bean oil, and then coating the first coating layer with a similarly based second layer containing a pH-regulating agent for regulating the pH level.

23. A process according to claim 22, wherein each coating layer is added at about 70° C.

24. The process of claim 22 wherein said agent is MgO.

25. The process of claim 24 wherein said agent is a mixture of trace element compounds.

26. The process of claim 25 wherein the trace-element compounds are, by weight are 43% MgO, 28% FeSO$_4$.2H$_2$O, 3% H$_3$BO$_3$, 5% CuSO$_4$.5H$_2$O, 9% Fe (EDTA), 9% MnSO$_4$ and 3% ZnSO$_4$.2H$_2$O.

27. The process of claim 25 wherein trace element compounds are, by weight, are 63% MgO, 3% H$_3$BO$_3$, 6% CuSO$_4$.5H$_2$O, 9% FeSO$_4$.2H$_2$O, 11% Fe (EDTA), 6% MnSO$_4$, 1% Na$_2$MoO.H$_2$O and 1% ZnSO$_4$.2H$_2$O, with a pH value of 8.1.

28. The process of claim 25 wherein trace element compounds are, by weight, are 87% MgO, and 13% FeSO$_4$.2H$_2$O, at a pH value of 8.8.

* * * * *